United States Patent
Choi

(10) Patent No.: US 8,352,239 B2
(45) Date of Patent: Jan. 8, 2013

(54) EMULATOR INTERFACE DEVICE AND METHOD THEREOF

(75) Inventor: Jong Pil Choi, Yongin-si (KR)

(73) Assignee: Korea Polytechnic University Industry Academic Cooperation Foundation (KR)

( * ) Notice: Subject to any disclaimer, the term of this patent is extended or adjusted under 35 U.S.C. 154(b) by 59 days.

(21) Appl. No.: 13/112,228

(22) Filed: May 20, 2011

(65) Prior Publication Data

US 2011/0225340 A1    Sep. 15, 2011

Related U.S. Application Data

(63) Continuation of application No. PCT/KR2010/004131, filed on Jun. 25, 2010.

(30) Foreign Application Priority Data

Jun. 26, 2009    (KR) .................. 10-2009-0057383

(51) Int. Cl.
*G06F 9/455* (2006.01)
(52) U.S. Cl. ................. 703/25; 702/23; 702/24
(58) Field of Classification Search ............ 703/23–25
See application file for complete search history.

(56) References Cited

U.S. PATENT DOCUMENTS

| 6,009,156 | A | 12/1999 | Cross |
| 6,651,225 | B1 | 11/2003 | Lin et al. |
| 7,437,282 | B2 * | 10/2008 | Musselman ............ 703/24 |
| 7,653,801 | B2 * | 1/2010 | Arndt et al. ............ 703/25 |
| 2008/0021695 | A1 | 1/2008 | Wang et al. |

FOREIGN PATENT DOCUMENTS

| JP | 06-096151 A | 4/1994 |
| JP | 09-231094 A | 9/1997 |
| JP | 2001-033522 A | 2/2001 |
| KR | 10-2007-0070680 A | 7/2007 |

* cited by examiner

*Primary Examiner* — Eunhee Kim
(74) *Attorney, Agent, or Firm* — Park & Associates IP Law, P.C.

(57) ABSTRACT

An interface device for an emulator is disclosed. The interface device includes a connection unit, a transmission unit, and an interface unit. The connection unit receives data, to be used to emulate a logic, from a host computer, and transmits result data, output from the logic, to the host computer. The transmission unit receives the data from the connection unit and stores (writes) the data in the first area of a register array. If the result data is stored in the second area of the register array, the transmission unit reads the result data and transmits the result data to the connection unit. The interface unit includes at least one register array, outputs a clock, set using the data stored in the first area, to the logic, and stores the result data, output from the logic, in the second area.

12 Claims, 3 Drawing Sheets

EMULATOR INTERFACE DEVICE AND METHOD THEREOF

REFERENCE TO RELATED APPLICATIONS

This is a continuation of pending International Patent Application PCT/KR2010/004131 filed on Jun. 25, 2010, which designates the United States and claims priority of Korean Patent Application No. 10-2009-0057383 filed on Jun. 26, 2009, the entire contents of which are incorporated herein by reference.

FIELD OF THE INVENTION

The present invention relates, in general, to an interface for an emulator, and, more particularly, to an interface device and method for an emulator, which can reduce the complexity of an interface, to be used to emulate a logic, using a register array, which can improve the performance of the interface, and which can communicate with a host computer through Peripheral Component Interconnection (PCI) Express.

BACKGROUND OF THE INVENTION

An emulator means a device or a program which imitates and implements the function of specific hardware or software using a different type of hardware or software. An emulator has been used as a method of overcoming various limitations and implementing compatibility when a computer is used.

With the use of such emulator, developers can effectively perform development operations when developing the control boards of various types of electronic products in which microprocessors (Central Processing Units (CPUs)) are used.

However, existing interface devices for emulating logics designed by developers are formed based on memory or message passing. Such an interface device based on memory uses separate memory, and therefore the structure of an interface device becomes complicated, with the result that it may be difficult to develop an interface device.

Therefore, there is a need for a device capable of reducing the complicity of an interface and improving the performance of the interface.

SUMMARY OF THE INVENTION

Accordingly, the present invention has been made keeping in mind the above problems occurring in the prior art, and an object of the present invention is to provide an interface device and method for an emulator which can reduce the complicity of an interface using register arrays, thereby improving the performance of the interface.

Another object of the present invention is to provide an interface device and method for an emulator which implements an emulator through PCI Express, with the result that System on Chip (SoC) is conveniently developed, so that the time for verification can be reduced.

A further object of the present invention is to provide an interface device and method for an emulator which reduces the complexity of an interface, thereby reducing the cost of the device In order to accomplish the above objects, an interface device for an emulator according to an embodiment of the present invention includes: a connection unit for receiving data, to be used to emulate a logic, from a host computer, and transmitting result data, output from the logic, to the host computer; a transmission unit for receiving the data from the connection unit and storing (writing) the data in the first area of a register array, and, if the result data is stored in the second area of the register array, reading the result data and transmitting the result data to the connection unit; and an interface unit including at least one register array, outputting a clock, set using the data stored in the first area, to the logic, and storing the result data, output from the logic, in the second area.

Here, the connection unit may be connected to the host computer through Peripheral Component Interconnect (PCI) Express.

The register array may be divided into an area on which both data reading and writing functions can be performed by the transmission unit and an area on which only the data reading function can be performed. The data stored in the first area may include a frequency which is used to set the clock and a clock generation time during which the clock is output to the logic.

The connection unit may provide information about the interface device to the host computer so that the corresponding interface device can be distinguished from some other interface device connected to the host computer.

An interface method for an emulator according to an embodiment of the present invention includes: receiving data to be used to emulate a logic from a host computer; storing the received data in the first area of a register array; setting a clock of the logic using the data stored in the first area, and outputting the set clock to the logic; receiving result data from the logic, and storing the result data in the second area of the register array; and transmitting the result data, stored in the second area, to the host computer.

DESCRIPTION OF REFERENCE NUMERALS OF PRINCIPAL ELEMENTS IN THE DRAWINGS

Figure 1:
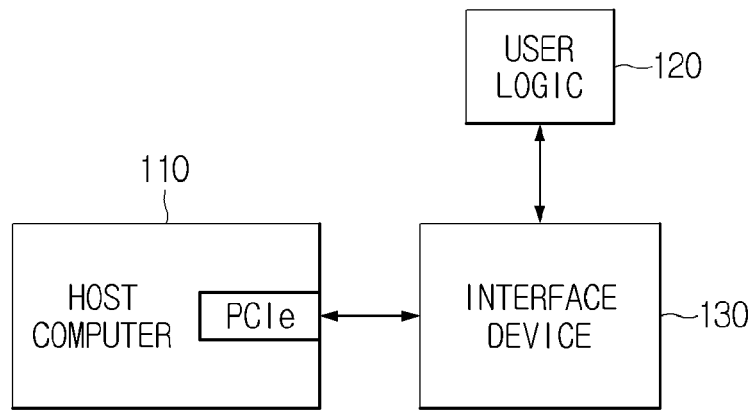
FIG. 1 is a view illustrating a system according to an embodiment in order to describe the present invention.

110: host computer
120: user logic
130: interface device
310: connection unit
320: transmission unit
330: interface unit
331: register array

DETAILED DESCRIPTION OF THE INVENTION

The above and other objects of the present invention will be clearly understood from the following description of embodiments taken in conjunction with the accompanying drawings.

An interface device and method for an emulator according to embodiments of the present invention will be described in detail below with reference to accompanying FIGS. 1 to 5. In the following description, when it is determined that detailed descriptions of related well-known configurations or functions would make the gist of the present invention obscure, they will be omitted.

FIG. 1 illustrates a system according to an embodiment in order to describe the present invention.

Referring to FIG. 1, the system includes a host computer 110, a user logic 120, and an interface device 130.

The host computer 110 designs a logic, creates the user logic 120 by applying a specific method, for example, Joint Test Action Group (JTAG), to the designed logic, generates data to be used for the emulation of the generated user logic 120 and transmits the generated data to the interface device 130, and receives result data, which correspond to the data to be used for the emulation, from the interface device 130 and displays the received result data on a screen.

Here, the host computer 110 and the interface device 130 may be connected through Peripheral Component Interconnect Express (PCIe), and the PCI Express will be described in brief below.

The PCI Express is a 3-generation high-performance Input/Output (I/O) bus which enables connection with peripheral devices, such as computing and communication platforms. The PCI Express is designed to be smoothly converted as a new I/O bus in such a way that the hardware/software infrastructure of existing PCI has been used without change, and includes various features of a next-generation bus that can overcome the limitations of existing I/O bus systems.

The interface device 130 according to the present invention can perform emulation using such PCI Express. Besides, any type of connection that can be connected between the host computer 110 and the interface device 130 may be used.

Further, the number of interface devices which can be connected to the host computer 110 varies depending on the number of interface slots provided in the host computer 110, for example, the number of PCI Express slots.

That is, the host computer 110 can emulate a number of user logics equal to the number of provided PCI Express slots using respective interface devices.

Figure 2:
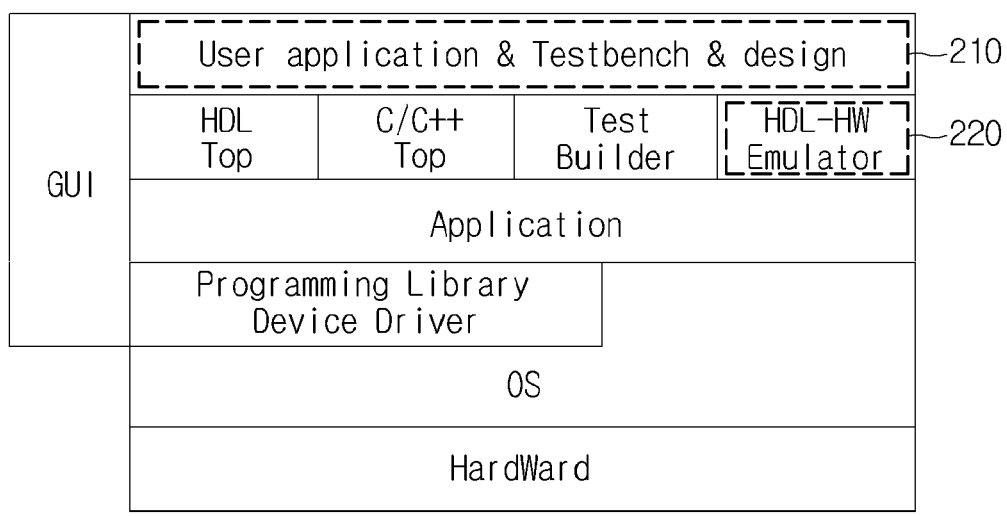
FIG. 2 is a block diagram illustrating an application on a host computer.

Further, the host computer 110 can design/generate a logic using the user application & test bench & design part 210 of an application block diagram shown in FIG. 2, and verify the user logic using the HDL-HW emulator part 220 thereof.

The user logic 120 refers to a board to which a logic designed by the host computer 110 has been downloaded using, for example, a Joint Test Action Group (JTAG) method. When a clock is received or input data is additionally received from the interface device 130 as needed, the user logic 120 provides result data corresponding to the clock or the input data to the interface device 130.

Here, the user logic 120 may include any type of elements to which a designed logic can be downloaded, such as a Field Programmable Gate Array (FPGA) or a Laser Programmable Gate Array (LPGA).

The interface device 130 receives data to be used to emulate the user logic 120 from the host computer 110, stores the received data in the preset area of at least one register array which is previously provided, for example, a first area, generates a clock to be provided to the user logic 120 using the data stored in the first area, and stores result data which has been outputted from the user logic 120 in the preset area of the register array, for example, a second area, such that the result data can be provided to the host computer.

Here, the interface device 130 can be connected with the host computer 110 through PCI Express. The first area of the register array can be read and written to by the host computer 110 while the second area of the register array can only be read. Such rights to write and read may vary depending on the situation.

The first and second areas of the register array mean a plurality of registers which constitutes the register array. For example, when a register array includes eight registers, the first area may include seventh to fourth registers, while the second area may include third to 0-th registers.

Although the division into the first and second areas may be sequentially performed in the order of registers, the division is not limited thereto, but the division into odd and even number registers may be performed. Further, any type of method capable of dividing a register array into two areas may be used.

Such an interface device will be described with reference to FIG. 3 below.

Figure 3:
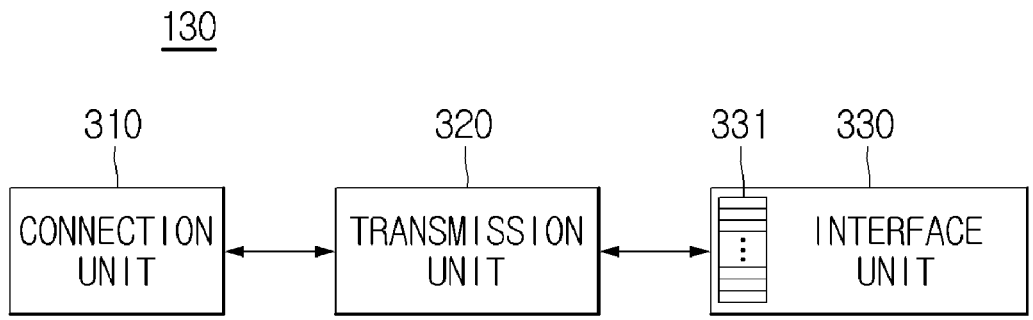
FIG. 3 is a view illustrating an interface device according to an embodiment of the present invention.

FIG. 3 shows the configuration of an interface device according to an embodiment of the present invention.

Referring to FIG. 3, the interface device 130 includes a connection unit 310, a transmission unit 320, and an interface unit 330.

The connection unit 310 receives data to be used to emulate the user logic from the host computer, and transmits result data, output from the user logic, to the host computer.

Here, the connection unit 310 is connected to a PCI Express slot of the host computer, thereby receiving the data used to emulate the user logic, for example, an instruction, an address corresponding to the location of a corresponding register, and clock setting data to be used to set a clock, from the host computer, and further receiving input data to be used as an input to the user logic.

The instruction received from the host computer may include all of the instructions related to the emulation, for example, an emulation start instruction, a read instruction, and a write instruction.

Further, when a plurality of PCI Express slots is provided such that a plurality of interface devices can be connected to the host computer, the connection unit 310 may provide information about the corresponding interface devices to the host computer so that the host computer can distinguish the interface devices, connected to the PCI Express slot, from each other.

The transmission unit 320 stores (writes) the received data in the first area of a register array 331 provided in the interface unit 330 based on the data received from the connection unit 310, or reads the result data stored in the second area of the register array 331 and provides the result data to the host computer through the connection unit 310.

That is, when the received data is data to be used to provide a clock and input data to the user logic, the transmission unit 320 stores the received data in the first area of the register array. The transmission unit 320 may store data to be used to set an instruction and a clock in at least one register included in the first area. When the received data is data to be used to read result data, the transmission unit 320 reads the result data stored in the second area of the register array and provides the result data to the connection unit 310.

Here, in order to prevent the case where the result data stored in the register included in the second area is modified by the host computer or the transmission unit, it is preferable to allow the transmission unit 320 to perform only a read operation on the second area, and it is preferable to allow the transmission unit 320 to perform both read and write operations on the first area in the same manner.

That is, the first area of the register array is an area related to the interface unit 330, and the second area of the register array is an area related to the user logic.

The interface unit 330 includes at least one register array 331. When data is stored in the first area of the register array, the interface unit 330 sets a clock using the stored data, outputs the set clock to the user logic and thereby activates the user logic, receives result data from the user logic, and stores the received result data in the second area of the register array such that the received result data can be transmitted to the host computer.

Here, the data to be stored in the first area may include a frequency which was used to set a clock, the clock generation time during which the set clock is output to the user logic, and the number of times that the clock is generated.

Figure 4:
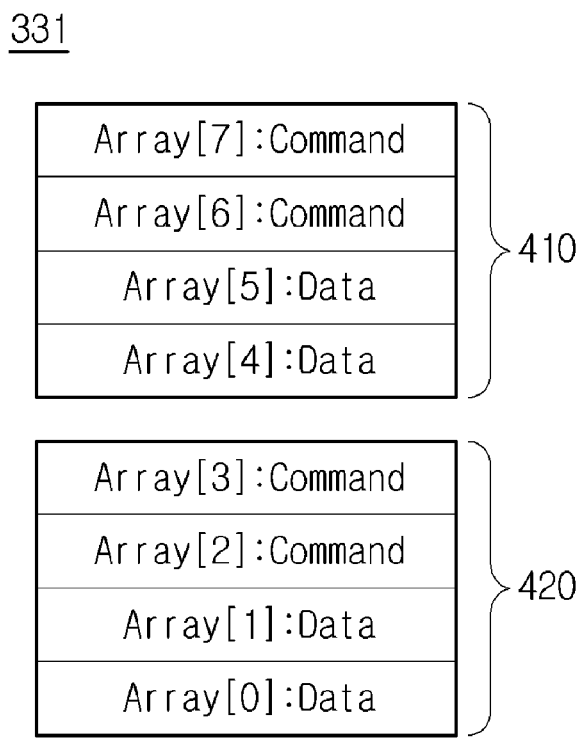
FIG. 4 is a view illustrating an example of a register array.

For example, the operation of the interface unit will be described on the assumption that the register array 331 includes eight registers, seventh to fourth registers (Array[7] to Array[4]) are included in a first area 410 and third to 0-th registers (Array[3] to Array[0]) are included in a second area 420, as shown in the example of FIG. 4.

When the transmission unit 320 stores an instruction related to the repetition of a clock in the seventh register, stores an instruction indicative of the end of the repetition in the sixth register, stores data related to a clock frequency in the fourth register and stores data related to a specific number of repetitions or infinite repetition in the fifth register, the interface unit sets a clock using the data stored in the fourth and fifth registers through the instruction stored in the seventh register. If an instruction indicative of the start of clock generation is stored in the seventh register again, the interface unit outputs the set clock to the user logic for a period equal to the clock generation time, or a number of times equal to the number of times that the clock is generated.

Here, when there is data input to the user logic, the input data may be stored in the fourth or fifth register.

When the user logic is activated using the clock, the interface unit 330 stores an instruction related to the user logic in the third and second registers and stores result data output from the user logic in the first and 0-th registers so that the transmission unit 320 can read the result data stored in the 0-th and first registers and provide the result data to the host computer.

Here, the result data stored in the 0-th and first registers may be a specific value or information about an address, and the result data may vary depending on the user logic.

The host computer may display an emulator related to the user logic using the result data of the user logic provided from the interface device.

As described above, the interface device according to the embodiment of the present invention uses a register array, and therefore the complexity of an interface for an emulator can be reduced, so that interface performance can be improved and the cost of an interface device can be reduced, thereby having the competitiveness of the price of an interface device.

Further, an emulator is implemented using a register array through PCI Express, so that a System on Chip (SoC) can be conveniently developed, thereby reducing the time for verification.

Figure 5:
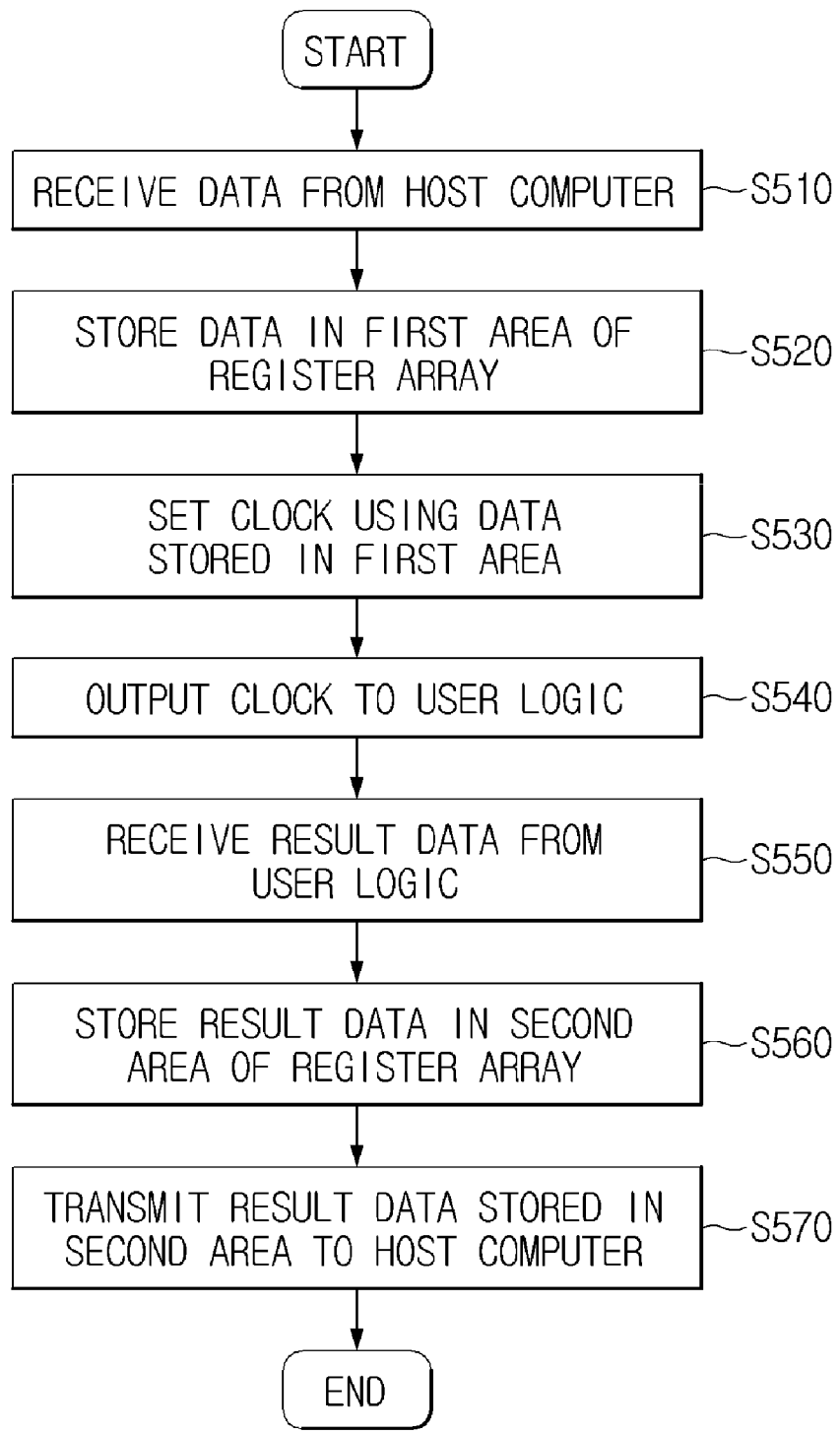
FIG. 5 is a flowchart illustrating an interface method for an emulator according to an embodiment of the present invention.

FIG. 5 is flowchart illustrating an interface method for an emulator according to an embodiment of the present invention.

Referring to FIG. 5, in the interface method, data, which is to be used to emulate a user logic which has been made in such a way that a logic designed by a host computer is downloaded using JTAG, is received from a host computer at step S510.

Here, the data received from the host computer may include information about the setting of a clock to be output to the user logic, for example, a clock frequency and the number of times that a clock is generated.

The data to be used to emulate the user logic may be received from the host computer using various communication methods, for example, PCI Express.

When the data is received, the received data is stored in the preset first area of a register array which was previously provided at step S520, and a clock to be output to the user logic is set using the data stored in the first area of the register array at step S530.

Here, the first area of the register array may be an area in which data necessary to output the clock to the user logic is stored.

When the clock is set, the clock is generated and output to the user logic at step S540. When the user logic is activated using the clock, result data is received from the user logic at step S550.

When the user logic requires input data as well as the clock depending on the situation, the input data received from the host computer and stored in the first area is output to the user logic, thereby receiving result data for the input data.

The result data received from the user logic is stored in the second area of the register array at step S560 and the result data stored in the second area is transmitted to the host computer at step S570, so that the host computer can display an emulator for the user logic.

Here, the second area of the register array is an area in which the result data received from the user logic is stored, and refers to an area in which only a read function is performed by the host computer in order to prevent the result data from being changed by the host computer.

The register array according to the present invention may be divided into a first area register and a second area register, and the register array may be divided into the first area and the second area using various methods.

The interface device and method for an emulator according to the present invention can be modified and applied in various forms within the scope of the technical spirit of the present invention, and is not limited to the above-described embodiments. Further, the preferred embodiments and drawings of the present invention have been disclosed not for the purpose of limiting the scope of the technical spirit of the present invention but for the purpose of illustrating the present invention in detail. In the above-described present invention, it will be apparent to those skilled in the art that various substitutions, modifications, and changes are possible without departing from the technical spirit of the invention, so that the present invention is not limited to the embodiments and the attached drawings, and the scope of the present invention must be determined based on not only the following claims but also equivalents thereof.

What is claimed is:

1. An interface device for an emulator, comprising:
an interface unit having at least one register array, wherein the register array comprises a first area for storing clock generation data for generating one or more clocks to a user logic, and a second area for storing output data generated by the user logic;
a connection unit for receiving the clock generation data from a host computer, and for transmitting the output data generated by the user logic to the host computer; and
a transmission unit for configuring the first area of the register array of the interface unit based on the clock generation data, and reading the output data from the second area of the register array to transmit the result data to the connection unit.

2. The interface device according to claim 1, wherein the register array comprises an area in which the transmission unit cannot perform write operations.

3. The interface device according to claim 1, wherein the clock generation data stored in the first area comprises frequency data for setting the clock, timing data for configuring clock generation time during which the clock is output to the logic, instructions for configuring the repetition of said clock generation.

4. The interface device according to claim 3, wherein:
the clock generation data stored in the first area comprises input data for the user logic; and the interface unit provides the input data to the user logic via the connection unit.

5. The interface device according to claim 1, wherein the connection unit provides identification information of the interface device to the host computer.

6. The interface device according to claim 1, wherein the connection unit communicates with the host computer through Peripheral Component Interconnect (PCI) Express.

7. The interface device according to claim 6, wherein the register array comprises an area in which the transmission unit cannot perform write operations.

8. The interface device according to claim 6, wherein the clock generation data stored in the first area comprises a frequency data for setting the clock, timing data for configuring clock generation time during which the clock is output to the logic, instructions for configuring the repetition of said clock generation.

9. The interface device according to claim 8, wherein:
the clock generation data stored in the first area comprises input data for the user logic; and the interface unit provides the input data to the user logic via the connection unit.

10. The interface device according to claim 6, wherein the connection unit provides identification information of the interface device to the host computer.

11. A method for implementing an emulator interface using one or more register arrays, comprising:
receiving clock generation data to be used to emulate a logic from a host computer via a connection unit;
storing the clock generation data in a first area of the register array;
generating a clock to the user logic using the clock generation data stored in the first area;
receiving output data from the user logic, and storing the output data in a second area of the register array; and
transmitting the output data, stored in the second area of the register array, to the host computer via the connection unit.

12. The method according to claim 11, wherein the clock generation data is received via the connection unit using PCI Express connected to the host computer, and the output data is transmitted to the host computer via the connection unit using the PCI Express.

* * * * *